(12) United States Patent
Power (10) Patent No.: US 11,016,224 B2
(45) Date of Patent: May 25, 2021

(54) COMBINATION MICROLENS OPTICAL DEVICE

(71) Applicant: CCL Secure Pty Ltd, Craigieburn (AU)

(72) Inventor: Gary Fairless Power, Craigieburn (AU)

(73) Assignee: CCL Secure Pty Ltd, Craigieburn (AU)

( * ) Notice: Subject to any disclaimer, the term of this patent is extended or adjusted under 35 U.S.C. 154(b) by 587 days.

(21) Appl. No.: 15/575,932

(22) PCT Filed: May 20, 2016

(86) PCT No.: PCT/AU2016/050383
§ 371 (c)(1),
(2) Date: Nov. 21, 2017

(87) PCT Pub. No.: WO2016/183635
PCT Pub. Date: Nov. 24, 2016

(65) Prior Publication Data
US 2018/0149775 A1 May 31, 2018

(30) Foreign Application Priority Data

May 21, 2015 (AU) ................. 2015100670
May 21, 2015 (AU) ................. 2015901865

(51) Int. Cl.
*G02B 3/00* (2006.01)
*B42D 25/425* (2014.01)
(Continued)

(52) U.S. Cl.
CPC ......... *G02B 3/0056* (2013.01); *B42D 25/324* (2014.10); *B42D 25/342* (2014.10); *B42D 25/425* (2014.10); *G02B 30/00* (2020.01)

(58) Field of Classification Search
CPC .. G02B 3/0056; G02B 3/0037; G02B 3/0006; G02B 3/0012; G02B 3/0031;
(Continued)

(56) References Cited

U.S. PATENT DOCUMENTS 5,712,731 A * 1/1998 Drinkwater .......... G02B 5/1885
359/619
2007/0058260 A1* 3/2007 Steenblik ............. B42D 25/355
359/626
(Continued)

FOREIGN PATENT DOCUMENTS

AU 2012101592 11/2012
EP 3285096 2/2018
(Continued)

OTHER PUBLICATIONS

International Search Report for PCT/AU2016050383, dated Aug. 29, 2016.
Office Action for AT48955 dated Jan. 24, 2020.

*Primary Examiner* — Stephone B Allen
*Assistant Examiner* — Adam W Booher
(74) *Attorney, Agent, or Firm* — Christopher M. Scherer; DeWitt LLP (57) ABSTRACT

An optical device, preferably a security device for a security document, including a substrate having a first side and a second side, an arrangement of microlenses located on the first side and an arrangement of microimages such that the microimages are viewable or can be made viewable through the microlenses, wherein the arrangement of microlenses includes first and second microlenses and wherein the arrangement of microimages includes first and second microimages, wherein the first microlenses and first microimages are configured for providing a first visual effect and wherein the second microlenses and second microimages are configured for providing a second visual effect, and wherein (Continued)

the first microlenses are of a different height with respect to the substrate than the second microlenses.

19 Claims, 10 Drawing Sheets

(51) Int. Cl.
  *B42D 25/324* (2014.01)
  *B42D 25/342* (2014.01)
  *G02B 30/00* (2020.01)
(58) Field of Classification Search
  CPC .... G02B 3/0043; G02B 3/005; G02B 3/0075; G02B 30/00; G02B 27/60; B42D 25/324; B42D 25/342; B42D 25/425; B42D 25/30; B42D 25/351; B42D 25/40; B42D 25/405; B42D 25/00; B42D 25/29; B42D 25/328
  See application file for complete search history.

(56) References Cited

U.S. PATENT DOCUMENTS

| 2008/0106091 | A1 | 5/2008 | Tompkin et al. |
| 2010/0277805 | A1 | 11/2010 | Schilling et al. |
| 2015/0352882 | A1* | 12/2015 | Jolic ............... B42D 25/45 359/619 |

FOREIGN PATENT DOCUMENTS

| WO | 2005052650 | 6/2005 |
| WO | 2008031170 | 3/2008 |
| WO | 2010099571 | 9/2010 |

* cited by examiner

COMBINATION MICROLENS OPTICAL DEVICE

CROSS-REFERENCE TO RELATED APPLICATIONS

The present application is the U.S. national stage application of International Application No. PCT/AU2016/050383, filed May 20, 2016, which international application was published on Nov. 24, 2016 as International Publication WO 2016/183635. The International Application claims priority of Australian Patent Application No. 2015100670, filed May 21, 2015 and Australian Patent Application No. 2015901865 filed on May 21, 2015, the contents of which are incorporated herein by reference in their entireties.

FIELD OF THE INVENTION

The invention generally relates the field of optical devices producing optically variable visual effects, such as security devices for documents.

BACKGROUND TO THE INVENTION

Microlens based optical devices are known to provide increased deterrence to counterfeiting. Such devices are typically formed on, or affixed to, a document requiring protection from counterfeiting, for example a banknote. The general operative principle of the microlens device is that an array (which may be a one or two dimensional array) of microlenses is configured for viewing a printed pattern, usually an array of microimages (that is, small images). The microlenses focus onto the microimages to provide a visual effect, which typically is an optically variable effect.

Two effects in particular are known which utilise such microlens arrangements. The first is an integral image effect, in which there is one microimage for each microlens, and as the angle of view is changed different portions of the microimage become visible through the lens. This arrangement allows for the presentation of a 3-dimensional image and/or an animation. The second is the so-called moiré magnifier, where the spacing between adjacent microlenses is slightly different to the spacing between adjacent microimages and/or the two arrays are rotated slightly with respect to one another. The effect is that enlarged versions of the microimages are visible through the lenses, which will appear to move and/or rotate and/or change size, as the angle of view is changed. Typically, the microimages of an integral image vary, whereas the microimages of a moiré image are identical, though variations to these arrangements are known in the art.

Generally, it is not the case that the same microlenses are optimal in providing two different visual effects, and designers of such optical devices will determine the optimal microlenses to use as required.

SUMMARY OF THE INVENTION

The inventors have realised that there are benefits in counterfeit deterrence to be obtained by combining two different microlens devices into one. In order to improve the visual effect of the composite device, different configurations of microlenses should be incorporated into the same microlens array, each configuration tailored to the type of device it is associated.

Therefore, according to an aspect of the present invention, there is provided an optical device, preferably a security device for a security document, including a substrate having a first side and a second side, an arrangement of microlenses located on the first side and an arrangement of microimages such that the microimages are viewable or can be made viewable through the microlenses, wherein the arrangement of microlenses includes first and second microlenses and wherein the arrangement of microimages includes first and second microimages, wherein the first microlenses and first microimages are configured for providing a first visual effect and wherein the second microlenses and second microimages are configured for providing a second visual effect, and wherein the first microlenses are of a different height with respect to the substrate than the second microlenses.

Typically, the first visual effect and second visual effect are distinguished by having different optimal microlens heights. Preferably, the first visual effect and second visual effect are also distinguished due to an optimal selection of at least one of: sag; base area; base shape; F-number; and focal length. In this case, the first and second microlenses may correspondingly include different values for at least one of: sag; base area; base shape; F-number; and focal length.

Optionally, the arrangement of microimages is located on the second side opposite the arrangement of microlenses, such that the microlenses and microimages are in a fixed relationship. Alternatively, the arrangement of microimages may be located on the first or second side such that the microlenses and microimages must be brought into an overlapping arrangement in order to view the microimages through the microlenses.

In an embodiment, the first and second microlenses are located on grid positions of a common microlens grid. In another embodiment, the first and second microimages are located on grid positions of a common microimage grid. Optionally, at least in this case, the first and second microimages are identical.

According to a second aspect of the present invention, there is provided an optical device, preferably a security device for a security document, including a substrate having a first side and a second side, an arrangement of microlenses located on the first side and an arrangement of microimages located on either first side or a second side of the substrate in a non-overlapping relationship or located on a different substrate to the microimages, wherein the arrangement of microlenses includes first and second microlenses and wherein the arrangement of microimages includes identical first and second microimages, wherein the first microlenses and first microimages are configured for providing a first visual effect and wherein the second microlenses and second microimages are configured for providing a second visual effect, and such that the optical device is configured to provide the first and second visual effects when the arrangement of microimages and the arrangement of microlenses are brought into an overlapping configuration.

Preferably, the first microlenses are of a different height with respect to the substrate than the second microlenses and/or include different values for at least one of: sag; base area; base shape; F-number; and/or focal length.

In an embodiment of either aspect, the first visual effect is a moiré magnifier visual effect and the second visual effect is an integral image visual effect. Optionally, one of the first and second microlenses is configured for in-focus viewing of its associated microimages and the other of the first and second microlenses is configured for out-of-focus viewing of its associated microimages. The microlenses configured for out-of-focus viewing may be configured to provide a contrast switch visual effect. Preferably, the first and second microimages are located on substantially the same plane.

For example, the first and second microimages may be formed in the same printing step using a common printing element.

In either aspect, both the first and second microlens grids and/or both the first and second microimage grid may be square or rectangular grids. Alternatively, the first and second microlens grids and/or the first and second microimage grids are selected from one of the five two-dimensional Bravais lattices. Also, optionally the first and second microimages are located according to the locations of corresponding first and second microimage masks. The first and second microlenses may be located according to the locations of corresponding first and second microlens masks, preferably wherein each first microlens is only present where the entire first microlens is located within a corresponding first microlens mask. Alternatively, wherein each second microlens may only be present where the entire second microlens is located within a corresponding second microlens mask.

Typically, according to either aspect, the microlenses are formed from an embossed and cured curable ink, preferably a radiation curable ink.

Optionally, the optical device further includes alignment means for guiding a user such as to achieve correct, or substantially correct, relative angular alignment between the arrangement of microlenses and the arrangement of microimages.

According to yet another aspect of the present invention, there is provided a document, preferably a security document and more preferably a banknote, having an optical device according to either of the first two aspects.

The document optionally has a substantially transparent document substrate, a portion of which corresponds to the substrate of the optical device. Alternatively, the document may have a substantially opaque document substrate, the optical device either affixed onto a surface of the document substrate and/or located within a cut-out region of the document substrate.

According to a still further aspect of the present invention, there is provided a method of manufacturing the optical device of the first two aspects, including the steps of: applying a radiation curable ink to a first side of a transparent substrate; embossing and curing the radiation curable ink, thereby forming the arrangement of microlenses; and printing, onto either the first side or the second side, the arrangement of microimages.

Preferably, the arrangement of microlenses is in registration with the arrangement of microimages located on the second side of the substrate opposed the microlenses.

Typically, the step of embossing the arrangement of microlenses and the step of printing the microimages are performed simultaneously, or at least substantially simultaneously. Also preferably, the first and second microimages are printed in the same printing step.

Optionally, the substrate corresponds to a region of a larger document substrate.

Security Document or Token

As used herein the term security documents and tokens includes all types of documents and tokens of value and identification documents including, but not limited to the following: items of currency such as banknotes and coins, credit cards, cheques, passports, identity cards, securities and share certificates, driver's licenses, deeds of title, travel documents such as airline and train tickets, entrance cards and tickets, birth, death and marriage certificates, and academic transcripts.

The invention is particularly, but not exclusively, applicable to security documents or tokens such as banknotes or identification documents such as identity cards or passports formed from a substrate to which one or more layers of printing are applied. The diffraction gratings and optically variable devices described herein may also have application in other products, such as packaging.

Security Device or Feature

As used herein the term security device or feature includes any one of a large number of security devices, elements or features intended to protect the security document or token from counterfeiting, copying, alteration or tampering. Security devices or features may be provided in or on the substrate of the security document or in or on one or more layers applied to the base substrate, and may take a wide variety of forms, such as security threads embedded in layers of the security document; security inks such as fluorescent, luminescent and phosphorescent inks, metallic inks, iridescent inks, photochromic, thermochromic, hydrochromic or piezochromic inks; printed and embossed features, including relief structures; interference layers; liquid crystal devices; lenses and lenticular structures; optically variable devices (OVDs) such as diffractive devices including diffraction gratings, holograms and diffractive optical elements (DOEs).

Substrate

As used herein, the term substrate refers to the base material from which the security document or token is formed. The base material may be paper or other fibrous material such as cellulose; a plastic or polymeric material including but not limited to polypropylene (PP), polyethylene (PE), polycarbonate (PC), polyvinyl chloride (PVC), polyethylene terephthalate (PET), biaxially-oriented polypropylene (BOPP); or a composite material of two or more materials, such as a laminate of paper and at least one plastic material, or of two or more polymeric materials.

Transparent Windows and Half Windows

As used herein the term window refers to a transparent or translucent area in the security document compared to the substantially opaque region to which printing is applied. The window may be fully transparent so that it allows the transmission of light substantially unaffected, or it may be partly transparent or translucent partially allowing the transmission of light but without allowing objects to be seen clearly through the window area.

A window area may be formed in a polymeric security document which has at least one layer of transparent polymeric material and one or more opacifying layers applied to at least one side of a transparent polymeric substrate, by omitting least one opacifying layer in the region forming the window area. If opacifying layers are applied to both sides of a transparent substrate a fully transparent window may be formed by omitting the opacifying layers on both sides of the transparent substrate in the window area.

A partly transparent or translucent area, hereinafter referred to as a "half-window", may be formed in a polymeric security document which has opacifying layers on both sides by omitting the opacifying layers on one side only of the security document in the window area so that the "half-window" is not fully transparent, but allows some light to pass through without allowing objects to be viewed clearly through the half-window.

Alternatively, it is possible for the substrates to be formed from an substantially opaque material, such as paper or fibrous material, with an insert of transparent plastics material inserted into a cut-out, or recess in the paper or fibrous substrate to form a transparent window or a translucent half-window area.

Opacifying Layers

One or more opacifying layers may be applied to a transparent substrate to increase the opacity of the security document. An opacifying layer is such that $L_T<L_0$, where $L_0$ is the amount of light incident on the document, and $L_T$ is the amount of light transmitted through the document. An opacifying layer may comprise any one or more of a variety of opacifying coatings. For example, the opacifying coatings may comprise a pigment, such as titanium dioxide, dispersed within a binder or carrier of heat-activated cross-linkable polymeric material. Alternatively, a substrate of transparent plastic material could be sandwiched between opacifying layers of paper or other partially or substantially opaque material to which indicia may be subsequently printed or otherwise applied.

Refractive Index n

The refractive index of a medium n is the ratio of the speed of light in vacuum to the speed of light in the medium. The refractive index n of a lens determines the amount by which light rays reaching the lens surface will be refracted, according to Snell's law:

$$n_1 * \operatorname{Sin}(\alpha) = n * \operatorname{Sin}(\theta),$$

where $\alpha$ is the angle between an incident ray and the normal at the point of incidence at the lens surface, $\theta$ is the angle between the refracted ray and the normal at the point of incidence, and $n_1$ is the refractive index of air (as an approximation $n_1$ may be taken to be 1).

Embossable Radiation Curable Ink

The term embossable radiation curable ink used herein refers to any ink, lacquer or other coating which may be applied to the substrate in a printing process, and which can be embossed while soft to form a relief structure and cured by radiation to fix the embossed relief structure. The curing process does not take place before the radiation curable ink is embossed, but it is possible for the curing process to take place either after embossing or at substantially the same time as the embossing step. The radiation curable ink is preferably curable by ultraviolet (UV) radiation. Alternatively, the radiation curable ink may be cured by other forms of radiation, such as electron beams or X-rays.

The radiation curable ink is preferably a transparent or translucent ink formed from a clear resin material. Such a transparent or translucent ink is particularly suitable for printing light-transmissive security elements such as sub-wavelength gratings, transmissive diffractive gratings and lens structures.

In one particularly preferred embodiment, the transparent or translucent ink preferably comprises an acrylic based UV curable clear embossable lacquer or coating.

Such UV curable lacquers can be obtained from various manufacturers, including Kingfisher Ink Limited, product ultraviolet type UVF-203 or similar. Alternatively, the radiation curable embossable coatings may be based on other compounds, eg nitro-cellulose.

The radiation curable inks and lacquers used herein have been found to be particularly suitable for embossing microstructures, including diffractive structures such as diffraction gratings and holograms, and microlenses and lens arrays. However, they may also be embossed with larger relief structures, such as non-diffractive optically variable devices.

The ink is preferably embossed and cured by ultraviolet (UV) radiation at substantially the same time. In a particularly preferred embodiment, the radiation curable ink is applied and embossed at substantially the same time in a Gravure printing process.

Preferably, in order to be suitable for Gravure printing, the radiation curable ink has a viscosity falling substantially in the range from about 20 to about 175 centipoise, and more preferably from about 30 to about 150 centipoise. The viscosity may be determined by measuring the time to drain the lacquer from a Zahn Cup #2. A sample which drains in 20 seconds has a viscosity of 30 centipoise, and a sample which drains in 63 seconds has a viscosity of 150 centipoise.

With some polymeric substrates, it may be necessary to apply an intermediate layer to the substrate before the radiation curable ink is applied to improve the adhesion of the embossed structure formed by the ink to the substrate. The intermediate layer preferably comprises a primer layer, and more preferably the primer layer includes a polyethylene imine. The primer layer may also include a cross-linker, for example a multi-functional isocyanate. Examples of other primers suitable for use in the invention include: hydroxyl terminated polymers; hydroxyl terminated polyester based co-polymers; cross-linked or uncross-linked hydroxylated acrylates; polyurethanes; and UV curing anionic or cationic acrylates. Examples of suitable cross-linkers include: isocyanates; polyaziridines; zirconium complexes; aluminium acetylacetone; melamines; and carbodiimides.

Metallic Nanoparticle Ink

As used herein, the term metallic nanoparticle ink refers to an ink having metallic particles of an average size of less than one micron.

BRIEF DESCRIPTION OF THE DRAWINGS

Embodiments of the invention will now be described with reference to the accompanying drawings. It is to be appreciated that the embodiments are given by way of illustration only and the invention is not limited by this illustration. In the drawings.

DESCRIPTION OF PREFERRED EMBODIMENTS

Figure 1A:
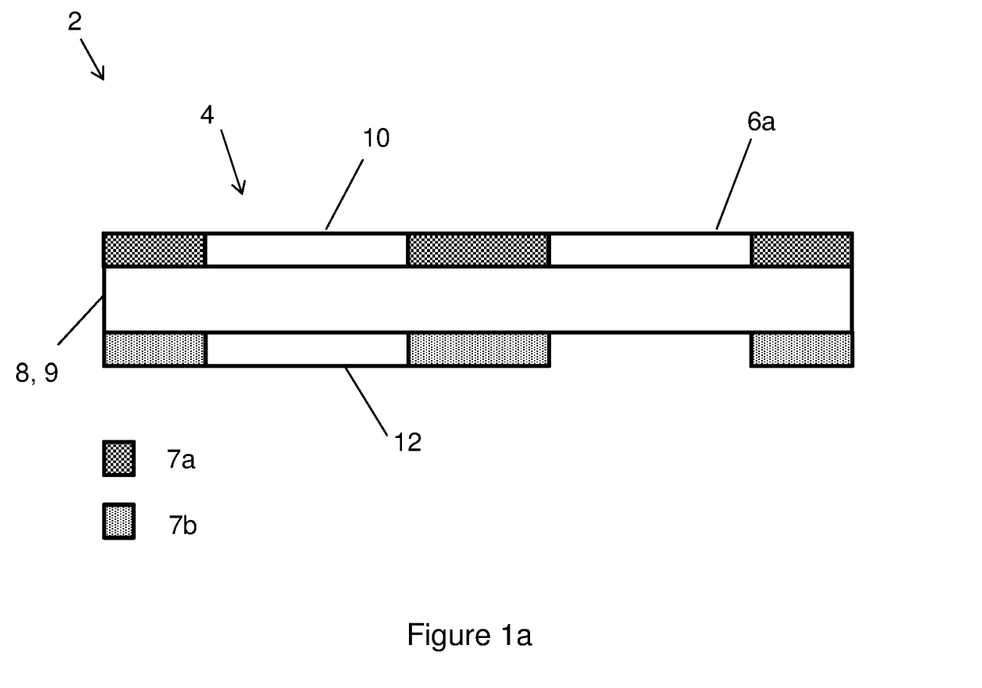
FIGS. 1*a*-1*c* show documents incorporating optical devices according to different embodiments.
Figure 1B:
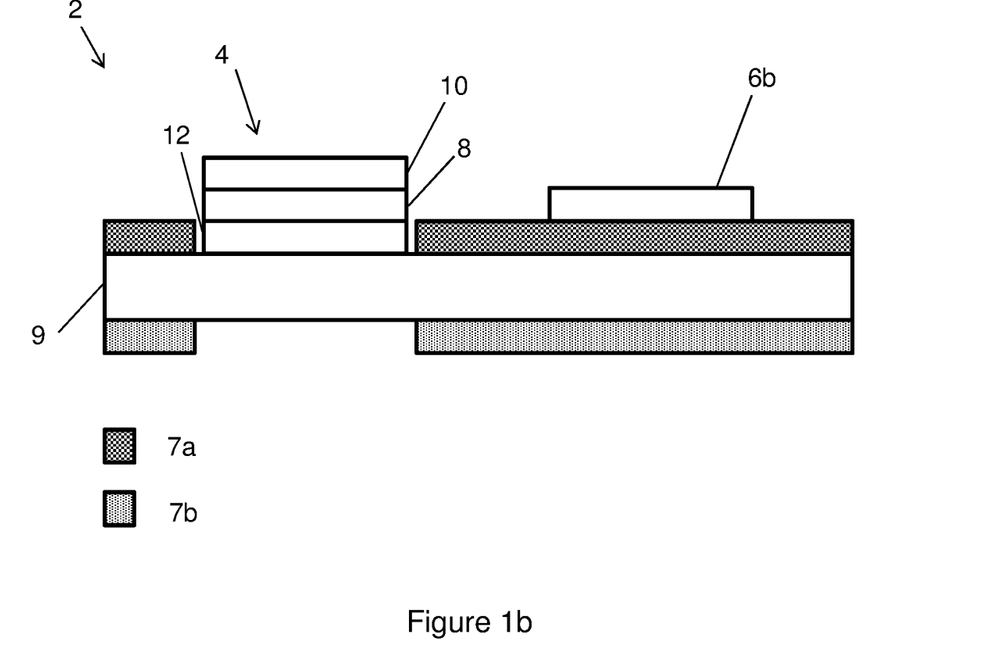
Figure 1C:
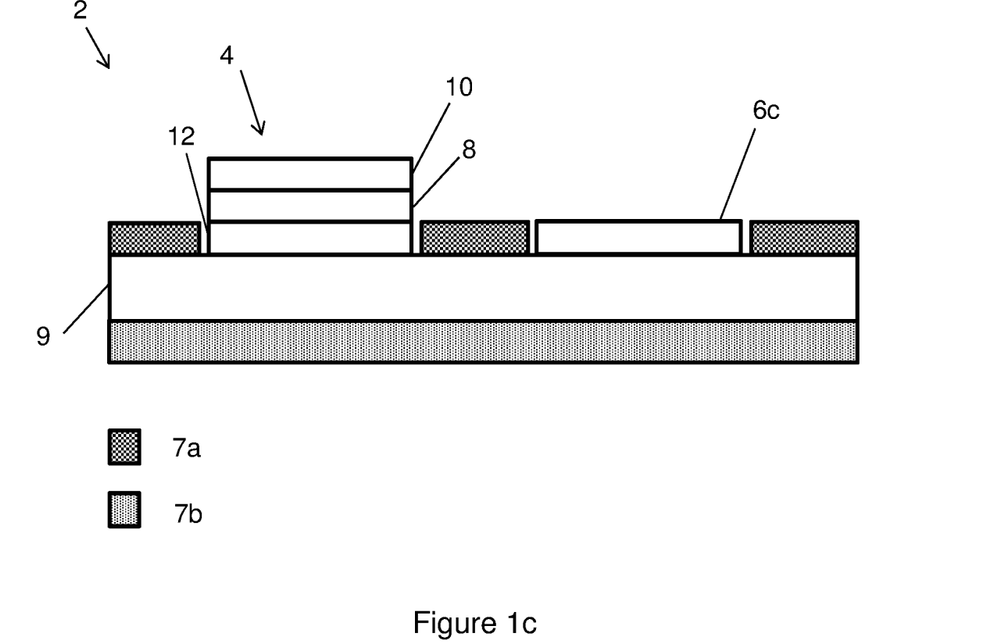

FIGS. 1*a* to 1*c* each show a document 2 having an optical device 4 according to embodiments of the invention. The optical device 4 comprises a transparent (or at least substantially transparent) substrate 8. The document 2 also comprises a substrate (herein, document substrate 9). In the embodiment of FIG. 1a, the two substrates 8, 9 are the same, that is, the optical device 4 and the document 2 share the same substrate 8, 9. In the embodiment of FIG. 1b, the document substrate 9 is different to the substrate 8 of the optical device 4.

In each case, the document 2 includes first and second opacifying layers 7a, 7b. The opacifying layers 7a, 7b act to reduce or eliminate the transparency of the document 2 in the regions in which the layers 7a, 7b are present. In the embodiments shown in FIGS. 1a and 1b, both opacifying layers 7a, 7b are not present in the area of the optical device 4, thereby causing the optical device 4 to be located within a window region of the document 2. In the embodiment of FIG. 1c, the device is located in a half-window region, wherein the second opacifying layer 7b completely covers the optical device 4 as shown, but the first opacifying layer 7a is absent in the region of the optical device 4.

It is also possible for the document 2 to be inherently opaque (or substantially opaque), for example where the document substrate 9 is paper or a paper composite material. In this case, separate opacifying layers 7a, 7b are not necessarily required. The optical device 4 in this case can still located in a window region of the document 2, which can be achieved using knowing methods such as forming the optical device 4 as a foil, and applying the foil to a cut-out area of the opaque document substrate 9. Otherwise, the optical device 4 is typically affixed to the document substrate 9, for example through hot stamping.

The optical device 4 typically provides a security function, that is, the optical device 4 acts to decrease the susceptibility of the document 2 to counterfeiting. The optical device 4 can be referred to as a "security device" or "security token" when used for this purpose. A document 2 requiring protection to counterfeiting is often referred to as a "security document".

FIGS. 1a to 1c also show further security features, such as 6a in FIG. 1a, 6b in FIG. 1b, 6c in FIG. 1c, which can assist in reducing the susceptibility of the document 2 to counterfeiting in combination with the optical device 4. In FIG. 1a, the further security feature 6a is implemented in a window region of the document 2, whereas in FIG. 1b the further security feature 6b is implemented in an opaque (i.e. non-window) region of the document 2. FIG. 1c shows the further security feature 6c implemented within a half-window region of the document 2. The illustrated arrangements are simply examples, and generally the document 2 can include one or more security features 6a, 6b, or 6c, each implemented in a window, half-window, or opaque region of the document 2. Examples of further security features 6a, 6b, and 6c include: optically variable devices such as diffractive optical elements, Kinograms®, microlens based features, holograms, etc.; watermark images; fine print; etc.

Figure 2:
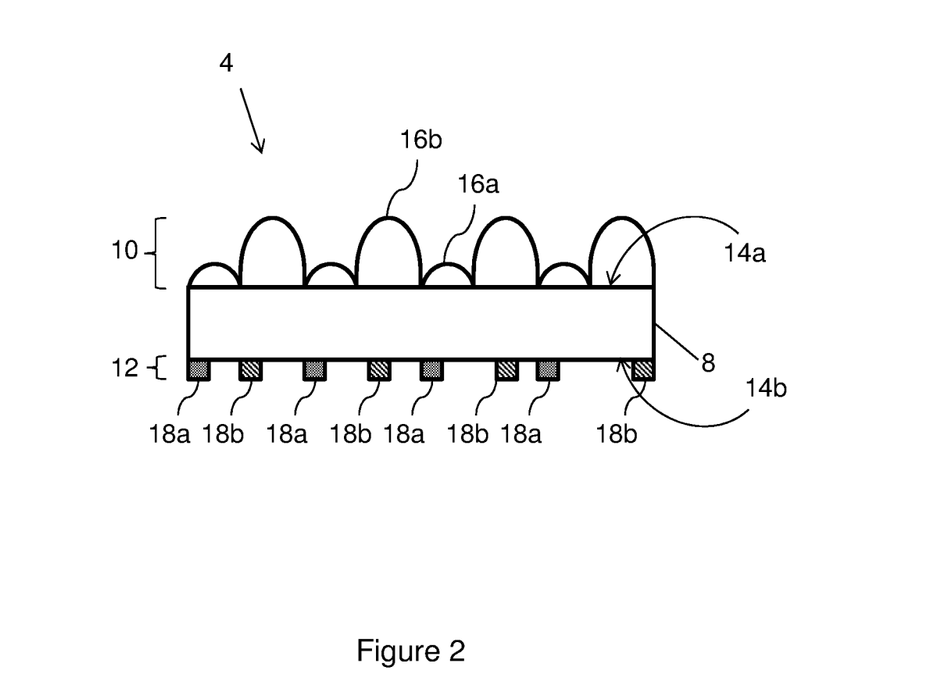
FIG. 2 shows an optical device having an arrangement of microlenses with different heights.

Referring to FIG. 2, an optical device 4 according to an embodiment is shown. The optical device 4 includes a microlens layer 10, comprising microlenses 16, which can be formed of a first side 14a of the substrate 8 through an embossing process utilising a radiation curable ink, such as disclosed in the applicant's PCT publication WO 2008/031170. The microlens layer 10 includes first microlenses 16a having a first height and second microlenses 16b having a second height, different to the first height.

Located on a second side 14b of the substrate 8 opposite the microlens layer 10 is a microimage layer 12. The microimage layer 12 comprises an arrangement of microimages 18, comprising first microimages 18a and second microimages 18b. Typically, the first and second microimages 18a, 18b lie on the surface of the second side 14b of the substrate, and, therefore, are on the same plane. The microimage layer 12 can be formed through printing of an ink, embossing, laser engraving, or any other suitable image forming process, onto the second side 14b. The first microimages 18a can be the same or different in appearance to the second microimages 18b.

Figure 3:
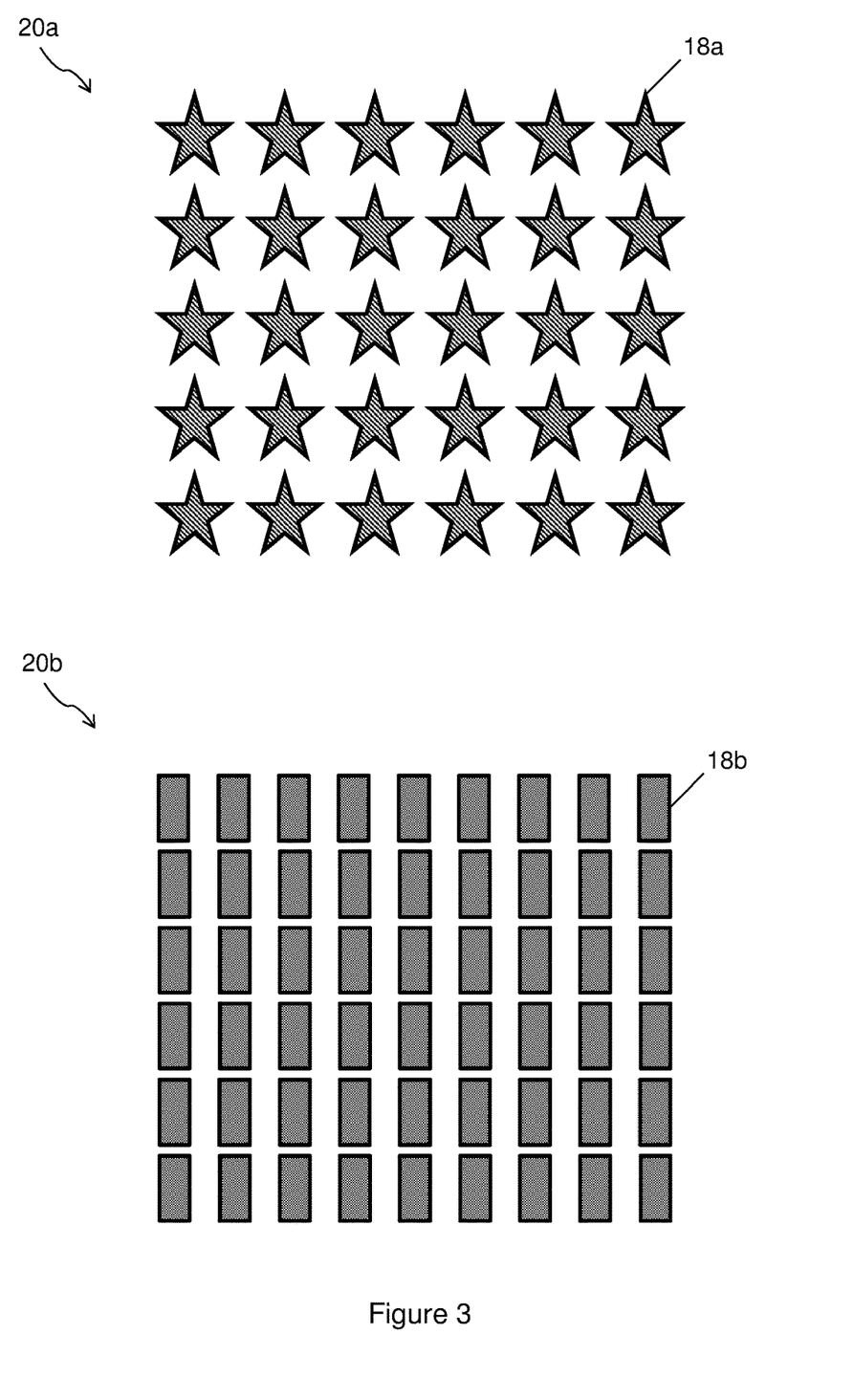
FIG. 3 shows two sets of microimages, one suitable for use as a moiré magnifier and the other for providing an integral image.

Referring to FIG. 3, the first and second microimages 18a, 18b are each arranged according to a periodic microimage grid 20 (first microimage grid 20a and second microimage grid 20b, respectively). For the purpose of FIG. 3, the first and second microimages 18a, 18b differ. The microimage grids 20a, 20b are typically of the same type, for example both rectangular grids as shown. In general, the microimage grids 20 can be of any suitable repeating type, for example one of the five Bravais lattices.

The first microlenses 16a and first microimages 18a are configured for providing a first visual effect, whereas the second microlenses 16b and second microimages 18b are configured for providing a second visual effect. Generally, according embodiments, the first and second visual effects are distinguished in that the first and second microlenses 16a, 16b have different optimal heights for producing the respective visual effect.

In the particular embodiment described, the first visual effect is a moiré magnifier visual effect and the second visual effect is a integral image visual effect. The first microlenses 16a are optimised for providing the moiré-magnifier visual effect at least through selection of the associated first height. Similarly, the second microlenses 16b are optimised for providing the integral image visual effect at least through selection of the associated second height, different to the first height.

Other parameters as well as or instead of height may be different between the first and second microlenses 16a, 16b in order to optimise each arrangement for its intended purpose. Such parameters include: sag; base area; base shape; F-number; and/or focal length. Where the base areas of the first and second microlenses 16a, 16b are different, it may be necessary to include gap between some or all adjacent microlenses 16.

Generally, an integral image may provide a relatively complicated optically variable effect (as well as relatively simple effects). A "contrast switch" as used herein is a relatively simple optically variable effect which can be considered a special case of an integral image. The contrast switch simply changes from one colour to another as the angle of view is changed, and therefore utilises identical microimages. For ease of illustration, the second microimages 18b shown are suitable for creating a contrast switch, though it is understood these could instead be configured according to a more general integral image.

It is envisaged that one of the first and second microlenses 16a, 16b will be implemented with a focal length configured to coincide with the location of the respective microimages 18a, 18b ("in-focus" configuration) whereas the other of the first and second microlenses 16a, 16b is implemented with a focal length configured to not coincide with the location of the respective microimages 18a, 18b ("out-of-focus" configuration). Such an "out-of-focus" configuration is described in WO 2010/099571 A1. This may be particularly applicable when implementing the contrast switch embodiment described above.

Figure 4A:
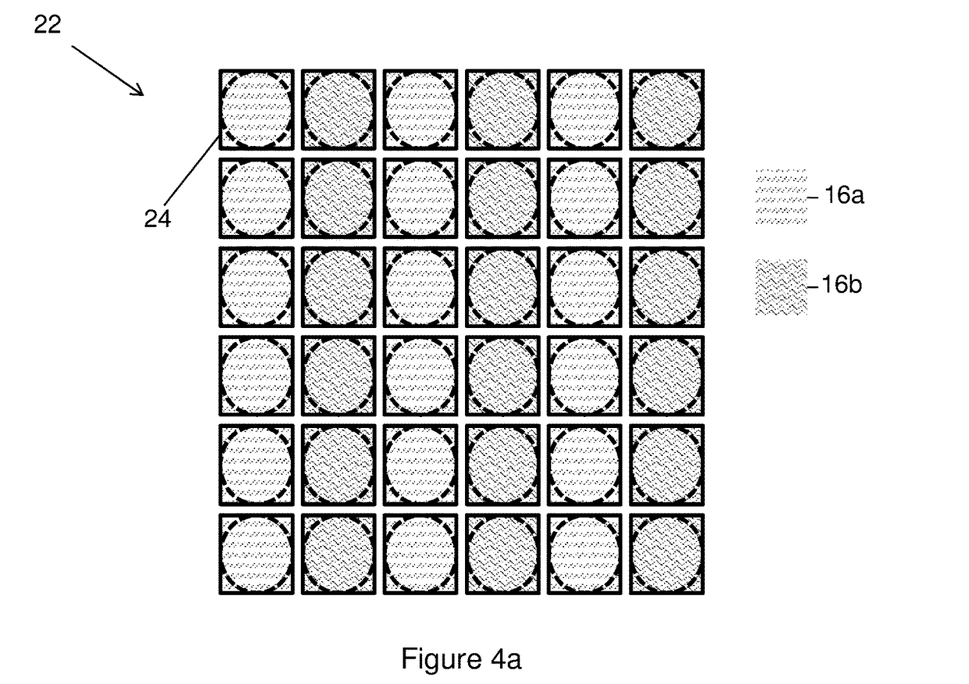
FIGS. 4*a* and 4*b* show two different arrangements of the microlenses.
Figure 4B:
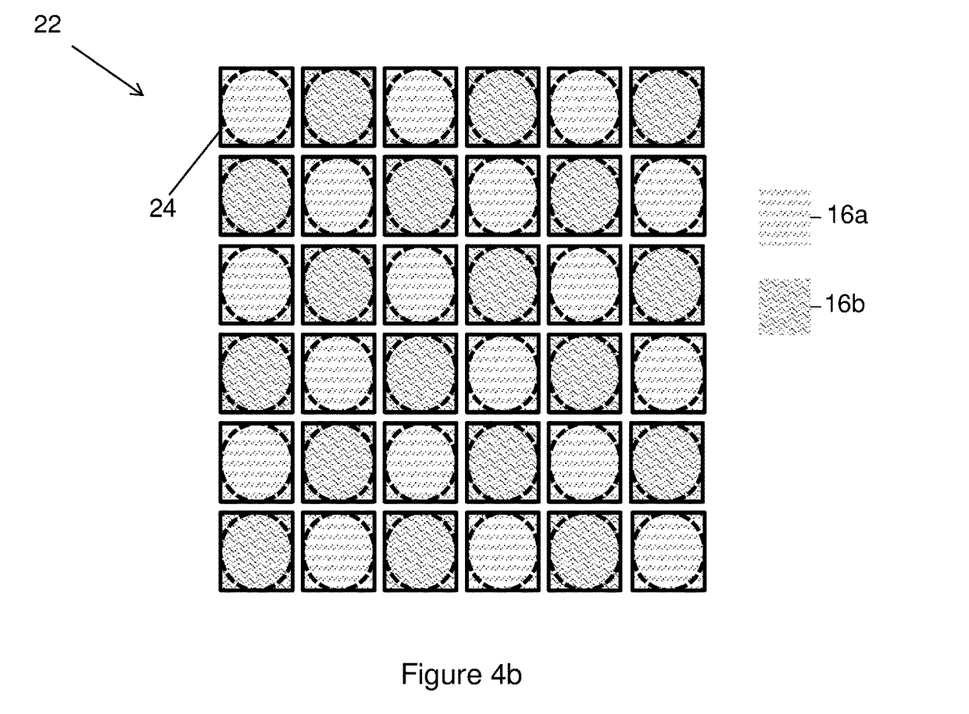
Figure 4C:
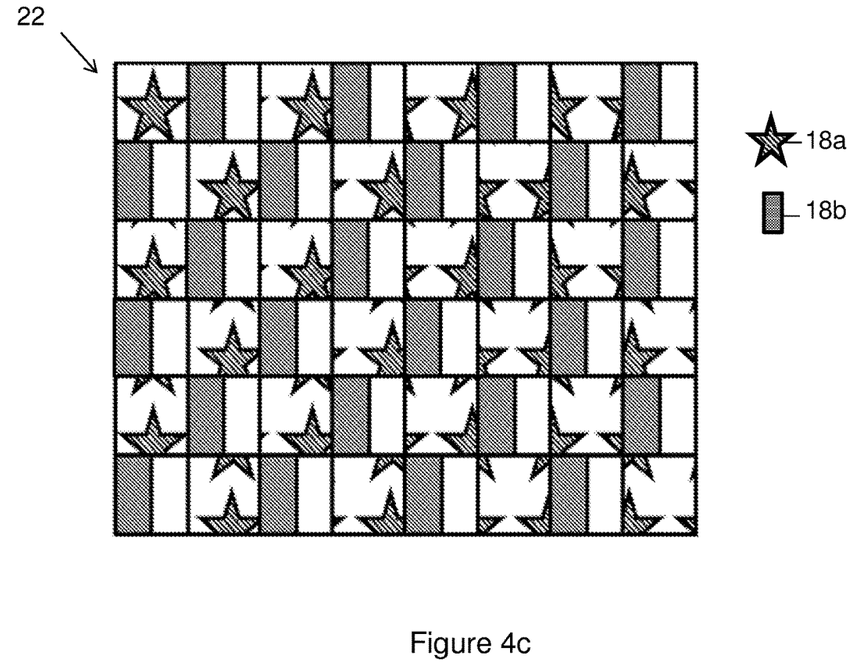
FIG. 4*c* shows microimages located as appropriate under the first and second microlenses.

According to an embodiment, as shown in FIGS. 4a to 4c, the first and second microlenses 16a, 16b are arranged according to a common microlens grid 22. In the implementation of FIG. 4a, the first and second microlenses 16a, 16b are arranged in alternating rows. In the implementation of FIG. 4b, the first and second microlenses 16a, 6b are arranged alternating in both directions (that is, left to right and top to bottom). It is understood that a number of different arrangements can be employed, for example similar microlenses 16 may be arranged in groups (for example, groups of four). In the figures, the type of microlens 16a, 16b is indicated by the shading within and surrounding the circle representing the microlens 16a, 16b, as indicated in the figures.

The square outlines in FIGS. 4a and 4b are associated with each microimage 16, and represent masks 24. The purpose of these is to define where the first microimages 18a and the second microimages 18b should be printed on the second side 14b, and they are therefore useful in the design of the first and second microimage grids 20a, 20b. This ensures that each microimage 18 is viewable through the correct type of microlens 16 (that is, each first microimage 18a is viewable through a first microlens 16a, and each second microimage 18b is viewable through a second microlens 16b as shown in FIG. 4c). Though the masks 24 are shown with gaps between them in the figures, this is not required and they may instead be in contact with adjacent masks 24. Also, it is not required that the bases of the microlenses 16 are in contact with the sides of the masks 24. Generally, it is required that the masks entirely contain their associated microlens 16. It should be noted that the masks 24 are not actually printed onto the second side 14b, and merely represent a convenient technique of determining the final pattern for printing.

Referring to FIG. 4c shows the effect of the masks 24; the first microimages 18a are only printed within masks 24 associated with the first microlenses 16a and the second microimages 18b are only printed within the masks 24 associated with the second microlenses 16b. For clarity, shading of the masks 24 from FIGS. 4a and 4b are not shown.

Another embodiment is shown in FIGS. 5a to 5d. Here, the first and second microimages 18a, 18b are arranged according to a common microimage grid 26 (see FIG. 5a). The first and second visual effects are distinguished in that they require different microlens spacings, and optionally are optimised according to different microlens heights and/or one or more other microlens parameters. In the specific embodiment described, the first visual effect is a moiré magnifier visual effect and the second visual effect is an integral image visual effect. In order to allow for both an integral image visual effect and a moiré-magnifier visual effect, it is necessary that the first and second microlenses 16a, 16b are not located on the common microlens grid 22 previously described, and are instead located on grid positions of a first microlens grid 22a (see FIG. 5b) and a second microlens grid 22b (see FIG. 5c), respectively.

"Spacing" is used herein to describe the period of a microlens 16 arrangement. For example, the spacing may correspond to the centre-to-centre distance between adjacent microlenses 16 within the arrangement. Typically, the spacing between adjacent microlenses 16 will include a microlens 16 diameter and any gap provided between adjacent microlenses 16.

The first and second microlens grids 22a, 22b are distinguished by one or both of grid spacing and grid alignment. Without further consideration, placing the microlenses 16 on the relevant grid positions could result in microlenses 16 overlapping one another. In order to account for this, microlens masks 28a, 28b are utilised. In one implementation (not shown), the microlenses 16 are simply placed where required under their associated microlens mask 28a, 28b, which can result in microlenses 16 being partially formed.

Figure 5A:
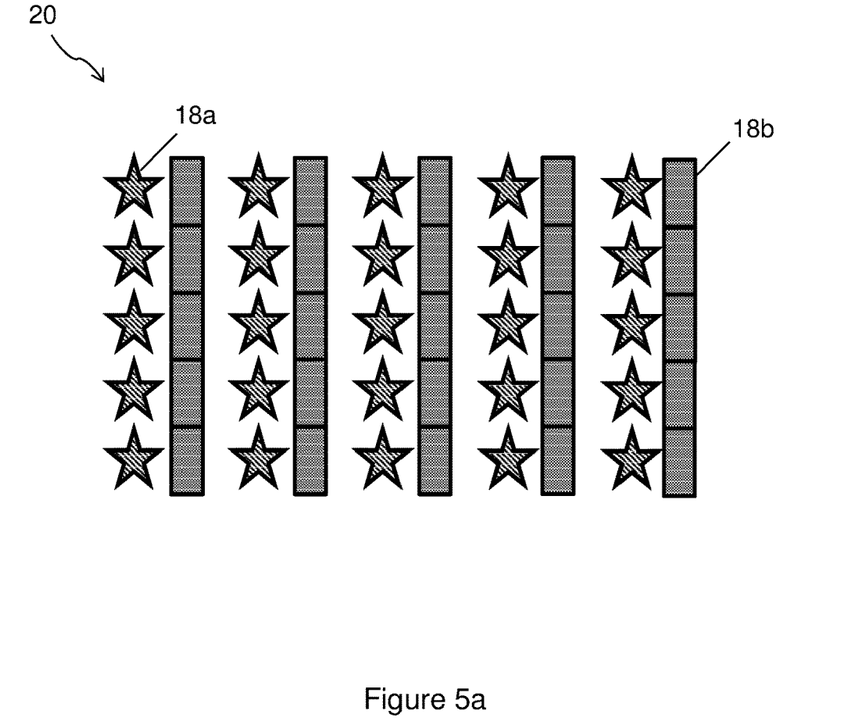
FIG. 5*a* shows two microimage grids located on a common microimage grid.
Figure 5B:
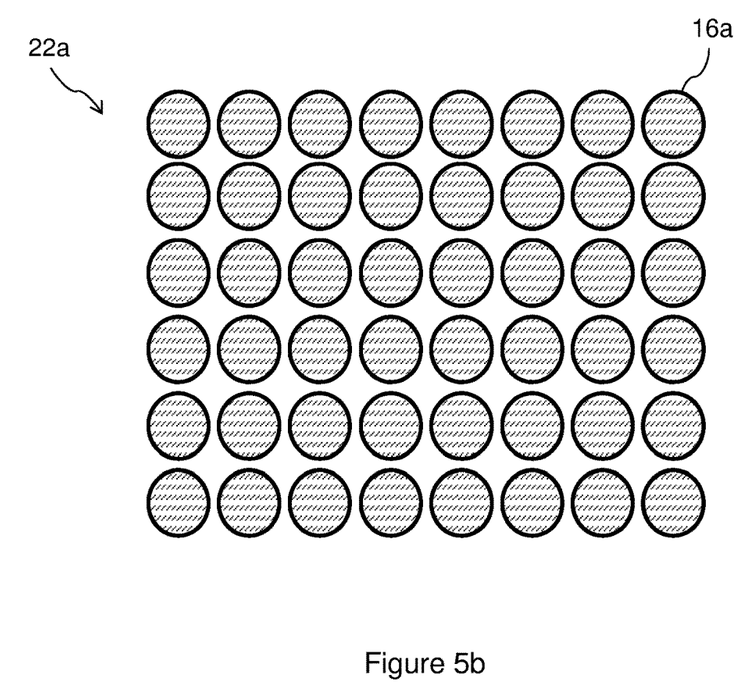
FIGS. 5*b* and 5*c* shows two microlens grids with different spacing.
Figure 5C:
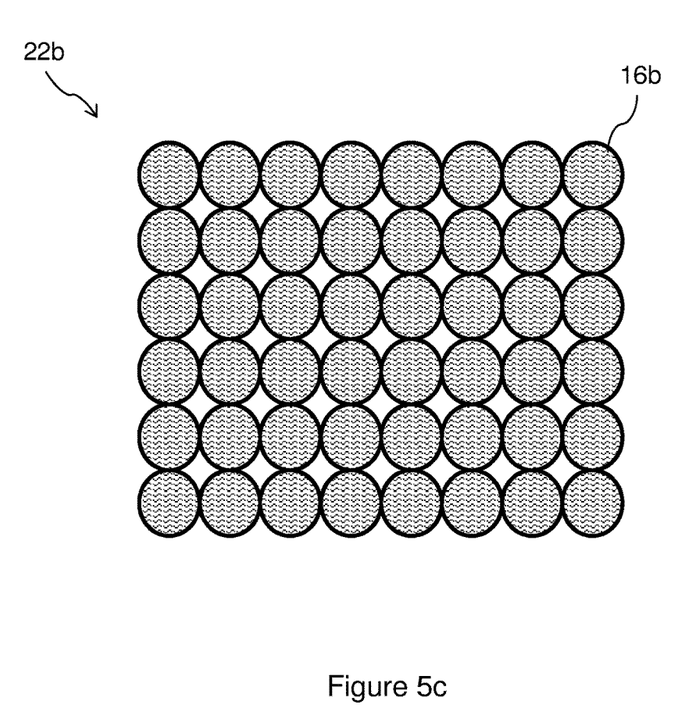
Figure 5D:
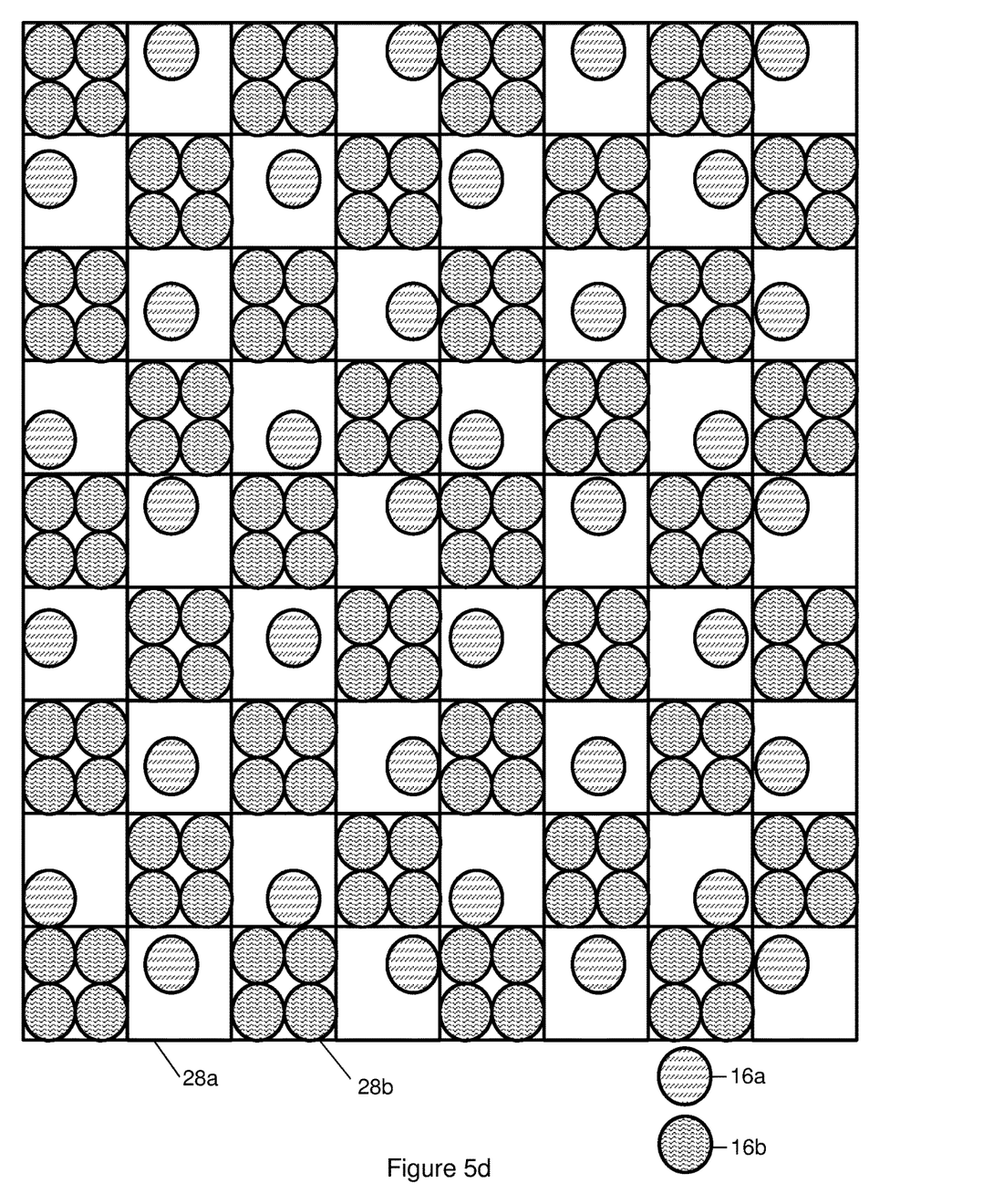
FIG. 5*d* shows the positioning of the first and second microlenses according to an embodiment.

However, in the implementation shown in FIG. 5d, the microlens masks 28a, 28b are configured to ensure that microlenses 16 are not partially formed. In order to achieve this, at least the first microlens masks 28a are required to have an area larger than that associated with the first microlenses 16a, typically each first microlens mask 28a has dimensions at least twice that of the spacing between adjacent first microlenses 16a (in FIG. 5d, the dimensions of the first microlens masks 28a are exactly twice the spacing of the first microlenses 16a). Instead of simply forming each first microlens 16a within an associated first microlens mask 28a, which may result in partial lens formation, only first microlenses 16a entirely present within an associated first microlens mask 28a are formed. This will result in a lower density of first microlenses 16a on the first side 14a.

In FIG. 5d the second microlens masks 28b are shown as having dimensions an integer multiple of the spacing between adjacent second microlenses 16b (the multiple in the case being two). This is not necessarily required, and more generally, the second microlens masks 28b should have dimensions at least a multiple of two larger than the spacing between adjacent second microlenses 16b. In this more general case, the same rule applies to the second microlenses 16b; that is, only complete second microlenses 16b are formed. It is possible for the first microlens masks 28a to have dimensions an integer multiple of the spacing between adjacent first microlenses 16a. In one particular embodiment, the dimensions of both the first and second microlens masks 28a, 28b are selected to be integer multiples of the spacing between their respect microlenses 16a, 16b.

According to one implementation, the second microlens masks 28b are equal in size to the first microlens masks 28a (for example, as shown in FIG. 5d). Another implementation, not shown, has different mask sizes for the first microlens masks 28a and the second microlens masks 28b. When the second microlens masks 28b have dimensions not equal to an integer multiple of the diameter of second the microlenses 16b, it is typically desirable to only form complete second microlenses 16b in a similar manner to that described regarding first microlenses 16a.

Figure 6A:
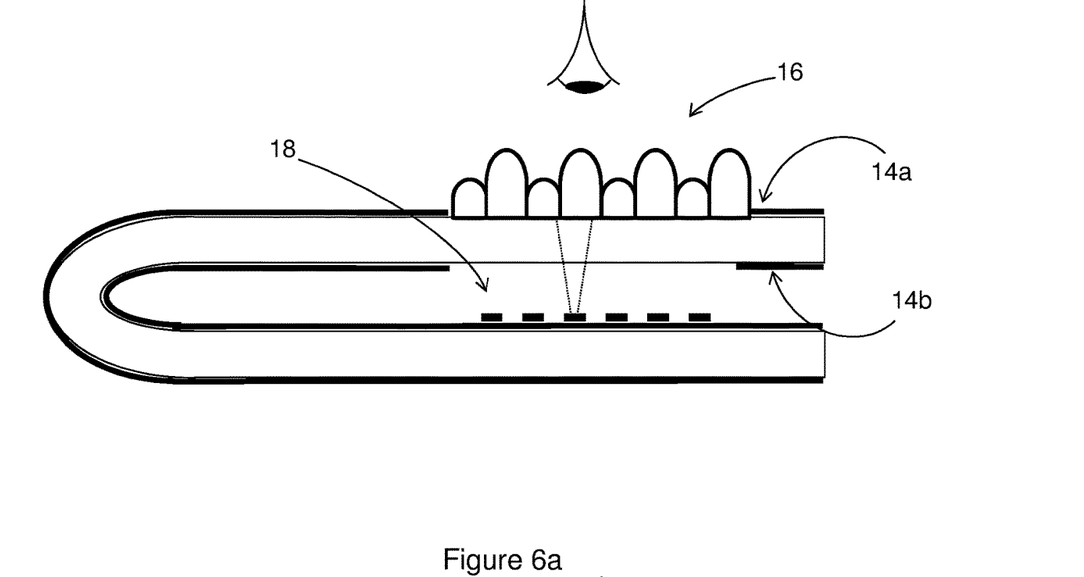
FIGS. 6*a* and 6*b* show self-verification arrangements.
Figure 6B:
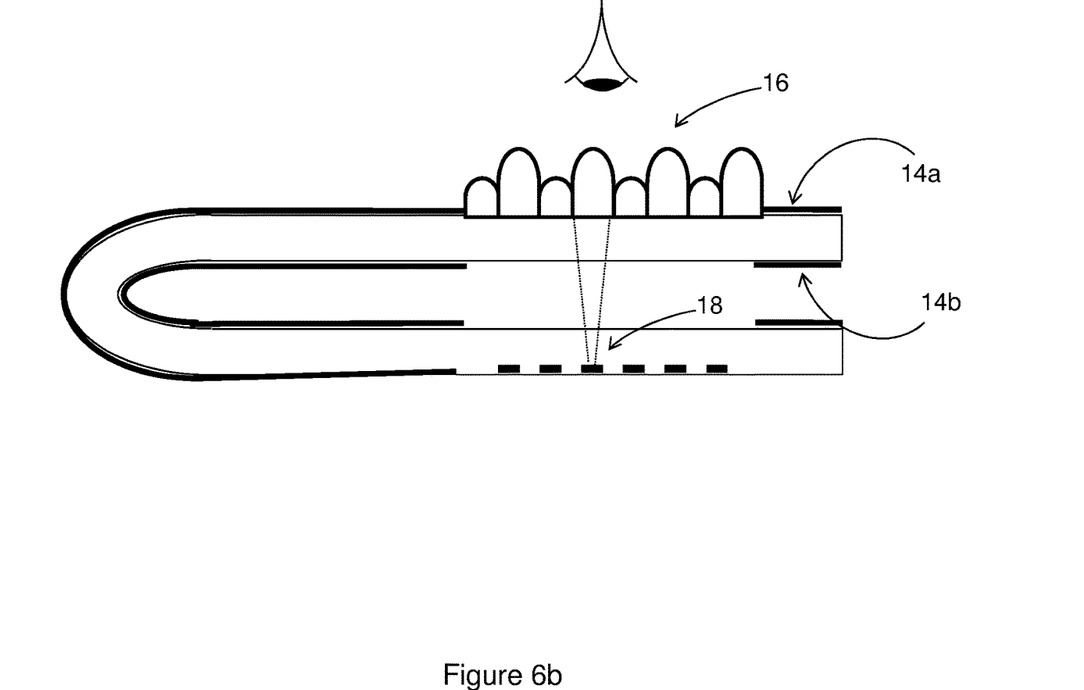
Figure 6C:
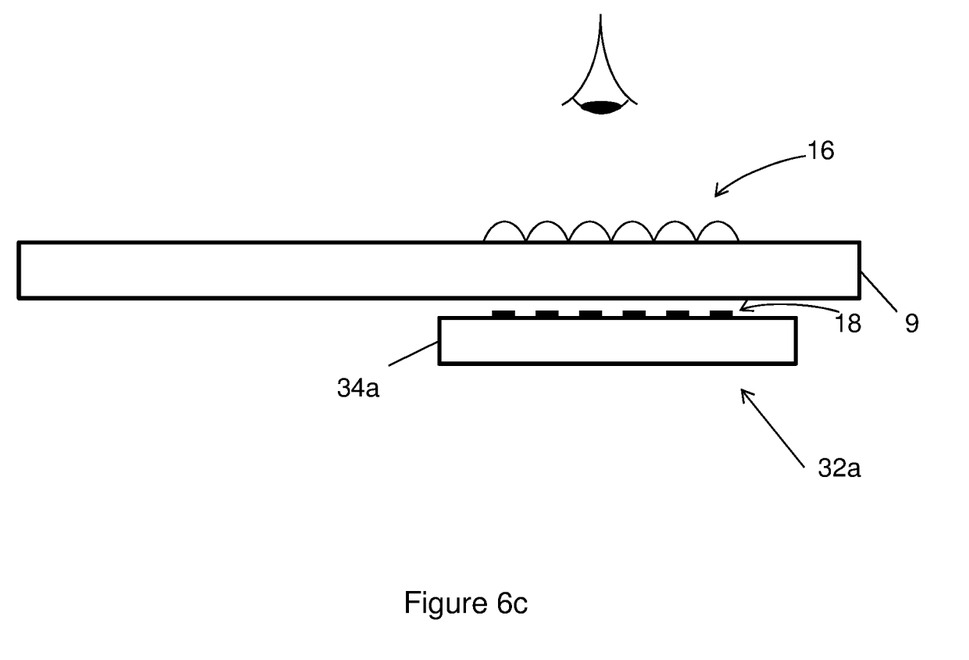
FIGS. 6*c* and 6*d* show verification arrangements.

Another embodiment, shown in FIGS. 6a to 6c, can be considered a variation of the embodiment of FIGS. 5a to 5c. In this embodiment, the microimages 18 are not printed directly opposite the microlenses 16. Instead, the microimages 18 are located elsewhere on the document 2, or alternatively, the microimages 18 and microlenses 16 are located on different substrates (one of the microlenses 16 and microimages 18 being present on the document 2). In order to view the optical effect, the microimages 18 must be brought into a position where the microimages 18 are viewable through the microlenses 16. When both the microlenses 16 and microimages 18 are located on the same document 2, this may be referred to a "self-verification arrangement".

The implementation of FIG. 6a shows the microimages 18 printed onto the first side 14a, in a different area of the document 2 to the microlenses 16. FIG. 5a also shows the document 2 folded in order to view the visual effect, that is, such that the microimages 18 are viewable through the microlenses 16a. The implementation of FIG. 6b shows the microlenses 16 formed onto the first side 14a and the microimages 18 printed onto the second side 14b in a different area of the document 2 to the microlenses 16. FIG. 6b also shows the document 2 folded in order to view the visual effect, that is, such that the microimages 18 are viewable through the microlenses 16a. FIGS. 6a and 6b show self-verification arrangements. As is clear, the focal distance of the microlenses 16 must be selected based on either the thickness of the document substrate 9 in the case of FIG. 6a or twice the thickness of the document substrate 9 in the case of FIG. 6b.

Figure 6D:
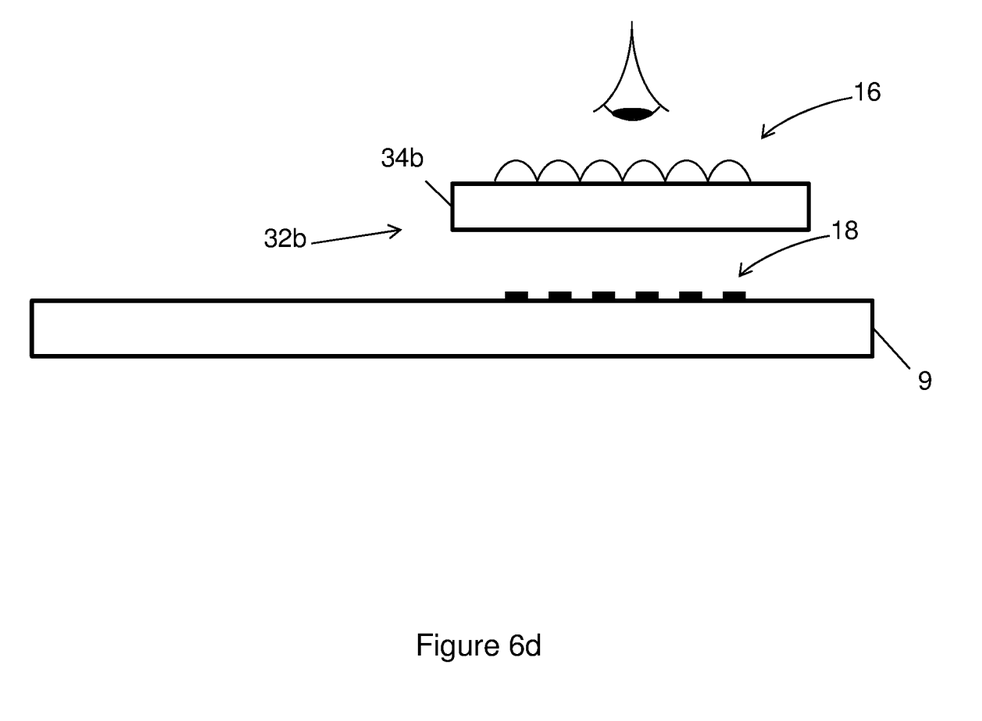

FIGS. 6c and 6d, on the other hand, show the document 2 and a separate verification element 32 (32a in FIG. 6c, 32b in FIG. 6d). In FIG. 6c, the microlenses 16 are located as a feature of the verification element 32a, which includes a transparent verification substrate 34a. As shown, in order to view the visual effect, the verification element 32a is arranged such that the microimages 18, located on the document 2, are viewable through the microlenses 16 of the verification element 32a. FIG. 6d shows the alternative situation, where it is the microimages 18 which are located as a feature of the verification element 32b. In this case, the verification substrate 34b can be transparent, translucent, or opaque, as desired. As shown, in order to view the visual effect, the verification element 32a is arranged such that the microimages 18 of the verification element 32b are viewable through the microlenses 16 located on the document 2.

The embodiment of FIGS. 6a to 6d cannot rely upon registration between the printed microimages 18 and the formed microlenses 16 in order to ensure first microimages 18a are located for viewing through first microlenses 16a and second microimages 18b are located for viewing through second microlenses 16b.

Figure 7:
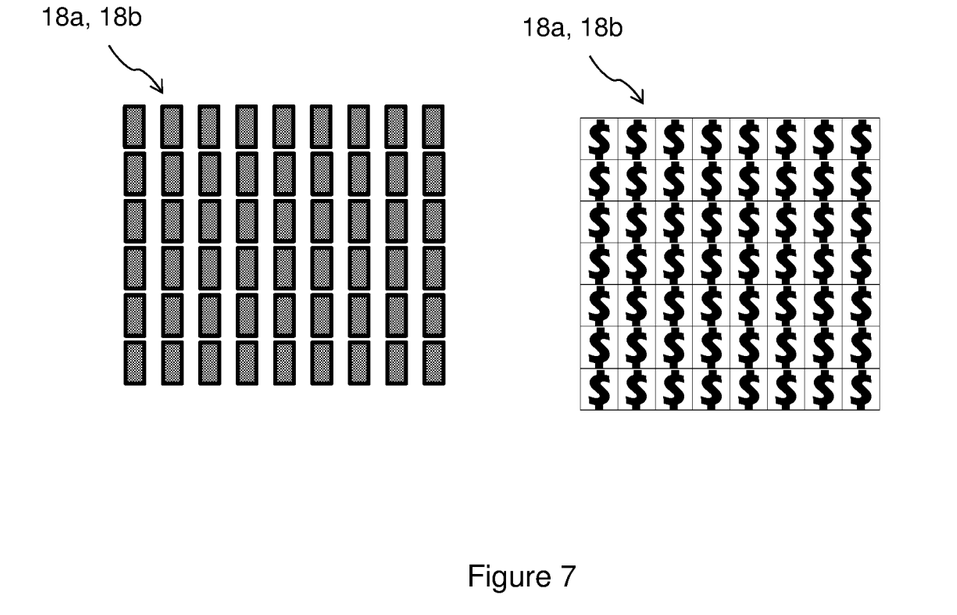
FIG. 7 show two example microimage grids for use in verification arrangements.
Figure 8:
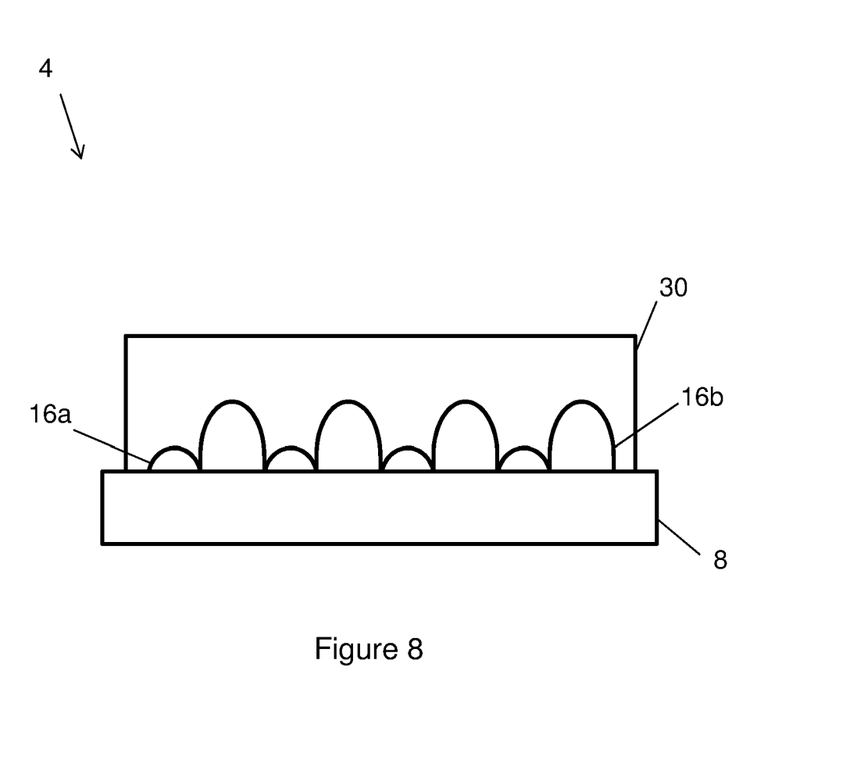
FIG. 8 shows a protective layer covering the microlenses.

In order to enable viewing of the two different visual effects, the first and second microimages 18a, 18b are identical and located on a common microimage grid 20. Therefore, microimages 18 should be selected that are suitable for use in producing both the first and second visual effect. For example, microimages 18 could be selected that are suitable for use in producing both a moiré magnifier visual effect and an integral image visual effect. For example, basic geometric shapes such as rectangles, circles, ovals, triangles, etc. may be used. It is also envisaged that symbols can be used, such as currency symbols, though it may be beneficial to design these with minimal fine detail. Typically, the integral imaging effect will be a contrast switch visual effect, as each microimage 18 is identical. In essence, as the angle of view is changed, each second microlens 16b will view the same point on the microimage 18. FIG. 7 shows two example arrays of microimages 18 (first and second microimages 18a, 18b identical).

The first and second microlenses 16a, 16b are arranged in a similar manner as described in relation to the embodiment of FIGS. 5a to 5c. The difference in arrangement between the first microlenses 16a and second microlenses 16b is the relative spacing between microlenses 16 and/or alignment of the microlenses 16. The second microlenses 16b have the same spacing as that of the first and second microimages 18a, 18b, which a requirement for an integral imaging/contrast switch arrangement. The first microlenses 16a have a different spacing and/or alignment when compared to the first and second microimages 18a, 18, which is a requirement for a moiré magnifier. In each case, the visual effect will be present despite the relative positioning of the microlenses 16 and microimages 18, as long as the alignment is correct or at least close to correct. What changes is the appearance of visual effect for a particular angle of view as the relative positioning changes.

In some implementations, guides are provided to enable consistent relative angular alignment of the microlenses 16 and microimages 18 when the microlenses 16 and microimages 18 are brought together such that the microimages 18 are viewable through the microlenses 16. The guides may be simply markings on the document 2 that a user utilises to align the microlenses 16 and microimages 18 before viewing the optical effect, or a physical feature such as embossed guide tracks.

Further counterfeit protection can be provided by applying a protective layer 30 onto the microlenses 16, as shown in FIG. 7. The protective layer 30 should have a refractive index substantially different to that of the microlenses 16, preferably lower than that of the microlenses 16. Further, as shown, the protective layer 30 should have an outwards facing surface profile that is substantially different to that of the microlenses 16. In particular, it is envisaged that the outwards facing surface profile is flat, or substantially flat.

In particular, the protective layer 30 is particularly useful in concealing the surface profile of the microlenses 16, which makes reproducing the microlenses 16 substantially more difficult, in particular by making it more difficult to identify the positioning of the microlenses 16 and the relative heights of the first and second microlenses 16a, 16b.

Further modifications and improvements may be incorporated without departing from the scope of the invention. For example, it is envisaged that cylindrical lenses can be utilised instead of spherical (or aspherical) lenses for the first and second microlenses 16a, 16b. The underlying principle is the same as that already described. That is, either the microlenses 16 or microimages 18 are located on a common grid, with the other arranged such that the first microlenses 16a and first microimages 18a are configured to provide a moiré magnifier effect and the second microlenses 16b and second microimages 18b are configured to provide an integral image effect. Benefits, as previously described, can be obtained by forming the first and second microlenses 16a, 16b with at least different heights and possible variations in other parameters. Another variation utilises multiple colours (more than two) for the microimages 18a and/or 18b.

It should also been noted that the use of masks in determining positions of microlenses 16 and/or microimages 18 is simply a useful technique for identifying the required layout of the microlenses 16 and/or microimages 18. Other techniques are also envisaged, for example, the use of any deterministic algorithms suitably configured to correctly locate the microlenses 16 and/or microimages 18.

The claims defining the invention are as follows:

1. A security device for a security document, including a substrate having a first side and a second side, an arrangement of microlenses located on the first side and an arrangement of microimages such that the microimages are viewable or can be made viewable through the microlenses,
   wherein the arrangement of microlenses includes first and second microlenses and wherein the arrangement of microimages includes first and second microimages,
   wherein the first microlenses and first microimages are configured for providing a first visual effect and wherein the second microlenses and second microimages are configured for providing a second visual effect,
   wherein the first microlenses are of a different height with respect to the first side of the substrate than the second microlenses, and
   wherein the first and second microimages are located substantially on the same plane.

2. The security device of claim 1, wherein the arrangement of microimages is located on the second side opposite the arrangement of microlenses, such that the microlenses and microimages are in a fixed relationship.

3. The security device of claim 1, wherein the arrangement of microimages is located on the first or second side such that the microlenses and microimages must be brought into an overlapping arrangement in order to view the microimages through the microlenses.

4. The security device of claim 3, further including alignment means for guiding a user so as to achieve correct, or substantially correct, relative angular alignment between the arrangement of microlenses and the arrangement of microimages.

5. The security device of claim 1, wherein the first and second microlenses are located on grid positions of a common microlens grid, and the first and second microimages are located on grid positions of a common microimage grid.

6. The security device of claim 5, wherein the first and second microimages are identical.

7. The security device of claim 1, wherein one of the first and second microlenses is configured for in-focus viewing of its associated microimages and the other of the first and second microlenses is configured for out-of-focus viewing of its associated microimages.

8. The security device of claim 1, wherein the first and second microlenses include different values for at least one of: sag; base area; base shape; F-number; and/or focal length.

9. The security device of claim 1, wherein both the first and second microlenses and/or both the first and second microimages are square or rectangular grids.

10. The security device of claim 1, wherein the first and second microimages are located according to the locations of corresponding first and second microimage masks.

11. The security device of claim 1, wherein the first and second microlenses are located according to the locations of corresponding first and second microlens masks.

12. The security device of claim 11, wherein each first microlens is only present where the entire first microlens is located within a corresponding first microlens mask and/or wherein each second microlens is only present where the entire second microlens is located within a corresponding second microlens mask.

13. The security device of claim 1, wherein the microlenses are formed from an embossed and cured radiation curable ink.

14. The security device of claim 1, wherein the first visual effect is a moiré magnifier visual effect and the second visual effect is an integral image visual effect.

15. A security document or a banknote, having a security device according to claim 1.

16. The security document or banknote of claim 15, further including a substantially transparent security document substrate, a portion of which corresponds to the substrate of the security device.

17. The security document or banknote of claim 15, further including a substantially opaque security document substrate, the security device either affixed onto a surface of the security document substrate or located within a cut-out region of the security document substrate.

18. A security device for a security document, including a substrate having a first side and a second side, an arrangement of microlenses located on the first side and an arrangement of microimages located on either the first side or the second side of the substrate in a non-overlapping relationship, or located on a different substrate to the microlenses,
wherein the arrangement of microlenses includes first and second microlenses and wherein the arrangement of microimages includes identical first and second microimages,
wherein the first microlenses and first microimages are configured for providing a first visual effect and wherein the second microlenses and second microimages are configured for providing a second visual effect wherein the first microlenses are of a different height with respect to the first side of the substrate than the second microlenses, and
such that the security device is configured to provide the first visual effect and the second visual effect when the arrangement of microimages and the arrangement of microlenses are brought into an overlapping configuration,
wherein the first and second microimages are located substantially on the same plane.

19. The security device of claim 18, wherein the first visual effect is a moire magnifier visual effect and the second visual effect is an integral image visual effect or a contrast switch visual effect.

* * * * *